United States Patent
Specht et al.

(10) Patent No.: US 11,095,547 B2
(45) Date of Patent: Aug. 17, 2021

(54) DETERMINING ZONED BUT INACTIVE I/O PATHS

(71) Applicant: EMC IP Holding Company LLC, Hopkinton, MA (US)

(72) Inventors: Michael E. Specht, Boxborough, MA (US); Vinay G. Rao, Bangalore (IN); Subin George, Framingham, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 267 days.

(21) Appl. No.: 16/263,042

(22) Filed: Jan. 31, 2019

(65) Prior Publication Data

US 2020/0252319 A1    Aug. 6, 2020

(51) Int. Cl.
| | |
|---|---|
| *H04L 12/26* | (2006.01) |
| *H04L 12/707* | (2013.01) |
| *H04L 12/751* | (2013.01) |
| *H04L 29/08* | (2006.01) |

(52) U.S. Cl.
CPC ........ *H04L 43/106* (2013.01); *H04L 43/0811* (2013.01); *H04L 45/02* (2013.01); *H04L 45/24* (2013.01); *H04L 67/1097* (2013.01)

(58) Field of Classification Search
CPC .............. H04L 43/106; H04L 43/0811; H04L 67/1097; H04L 45/02; H04L 45/24; H04L 43/10
See application file for complete search history.

(56) References Cited

U.S. PATENT DOCUMENTS

| | | | | |
|---|---|---|---|---|
| 8,520,533 | B1* | 8/2013 | Gill | H04L 43/0811 370/242 |
| 9,483,331 | B1* | 11/2016 | Bijoy | G06F 13/102 |
| 2006/0092843 | A1* | 5/2006 | Iwami | H04L 29/06 370/235 |
| 2012/0005327 | A1* | 1/2012 | Sato | G06F 11/327 709/223 |
| 2013/0013617 | A1* | 1/2013 | Cai | G06F 16/2272 707/746 |
| 2014/0372636 | A1* | 12/2014 | Li-On | G06F 11/3051 710/18 |
| 2016/0197994 | A1* | 7/2016 | Nazari | G06F 13/16 709/219 |

* cited by examiner

*Primary Examiner* — Nicholas R Taylor
*Assistant Examiner* — Sanjoy Roy
(74) *Attorney, Agent, or Firm* — Muirhead and Saturnelli, LLC

(57) ABSTRACT

Combinations of host ports and storage ports (e.g., I-T pairs) on a storage network that are zoned but not masked may be determined, without accessing a switch or network administrator. Heartbeat communications (heartbeats) may be transmitted from host systems to each storage device of a storage system of which the host system is aware, along the one or more I/O paths of which the host is aware to the storage port of the I/O path. The storage devices may include one or more nominal devices defined for I-T pairs for which I/O connectivity has not been defined for any storage devices. The storage system may maintain a master heartbeat (heartbeat) table that may include a plurality of entries, each entry corresponding to a combination of a host port, storage port and storage device, and storing a time stamp value for a most recent heartbeat received for the combination.

20 Claims, 9 Drawing Sheets

FIG. 8

| Storage Device | Host Port | Storage System Port | Other Info |
|---|---|---|---|
| Dev0 | WWN12 | WWN45 | |
| Dev1 | WWN9 | WWN117 | |
| ... | | | |
| Devn | WWN77 | WWN6 | |

800 — table
802 — Storage Device
804 — Host Port
806 — Storage System Port
808 — Other Info
810a, 810b, 810c — rows (810)

FIG. 9

| Initiator Port | Target Port | Other Info |
|---|---|---|
| WWW1 | WWW3 | |
| WWW7 | WWW8 | |
| ... | | |
| WWW9 | WWW2 | |

900 — table
902 — Initiator Port
904 — Target Port
906 — Other Info
910a, 910b, 910c — rows (910)

DETERMINING ZONED BUT INACTIVE I/O PATHS

BACKGROUND

Technical Field

This application generally relates to data storage and, in particular, connectivity between hosts and data storage resources.

Description of Related Art

Data storage systems may include resources used by one or more host systems (i.e., "hosts"). Data storage systems and host systems may be interconnected by one or more communication connections such as in a network. These resources may include, for example, data storage devices such as those included in the data storage systems manufactured by EMC Corporation of Hopkinton Mass. ("Dell EMC"). These data storage systems may be coupled to one or more host systems, where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform I/O operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems also may be used.

One or more hosts and one or more storage system may be part of a storage network, for example, a storage area network (SAN), that also includes one or more switches. A switch may include a plurality or ports configured to be connected (e.g., by a cable) to ports of a host system. These switch ports may be referred to herein as switch host ports (SHPs) or fabric ports. A switch also may include one or more ports configured to be connected (e.g., by a cable) to ports on a storage system (e.g., on a front-end of a storage system as part of a host adapter), which may be referred to herein as switch storage ports or SSPs. The one or more switches may be organized into one or more logical switching entities referred to herein as switch fabric (i.e., "fabric"). A fabric is a logical entity that includes one or more SHPs and one or more SSPs as its members, for which I/O connectivity associated with the fabric are only permitted between the member SHPs and SSPs, and not with any SHP or SSP that is not a member of the fabric. A fabric may include SHPs and/or SSPs from different switches, or may include only SHPs and/or SSPs of a single switch, for example, all of the SHPs and/or SSPs of a switch or a subset thereof. A fabric may be considered to define a virtual SAN (i.e., "VSAN"), and the term VSAN is sometimes used interchangeably with the term "fabric." Each fabric may have a unique identifier referred to herein as a "fabric name," which may be synonymous with a VSAN name.

A host system may host applications that utilize storage devices of the storage system. For a given application, to perform I/O operations utilizing a storage device of the storage system, one or more components of each of: a host; a switch; and a storage system may be used; i.e., communications for performing I/O operations may be transmitted through these one or more components. The one or more combinations of components of the host, switch and storage system over which I/O operations between an application and storage device can be communicated may be considered an I/O path between the application and the storage device. These I/O paths define a connectivity of the storage network.

SUMMARY OF THE INVENTION

In some embodiments of the invention, for a storage network including one or more host systems coupled to a storage system having a plurality of storage devices, a plurality of heartbeat communications are received at one or more storage ports of the storage system from the one or more host systems, each heartbeat communication indicative of current I/O connectivity between a combination of a respective host port of the one or more host systems and a respective one of the storage ports, wherein, for at least a first combination, no I/O connectivity is currently enabled for any of the plurality of storage devices. It is determined from the heartbeat communications that one or more combinations of a host port and a storage port have I/O connectivity currently enabled between the host port and storage device, but no I/O connectivity currently enabled between the host port and the storage port for any of the plurality of storage devices. A first data structure may be maintained on the storage system, the first data structure including a plurality of entries, each entry corresponding to a combination of a storage port of the storage system and a host port of one of the one or more host systems between which I/O connectivity has been enabled at least at one point in time, and, in response to each heartbeat communication for each at least first combination, an entry of the first data structure that corresponds to the at least first combination nay be updated with a time stamp value corresponding to a time at which the heartbeat communication was received at one of the storage ports. The determining may include determining from the first data structure that one or more combinations of a host port and a storage port have I/O connectivity currently enabled between the host port and storage device, but no I/O connectivity currently enabled between the host port and storage device for any of the plurality of storage devices. Maintaining the first data structure may include recording, for each combination of a host port and a storage port having an entry in the data structure, a time stamp value of a last heartbeat communication, if any, received for each combination. Two or more of the plurality of entries may be sorted based at least in part on the time stamp values of the two or more entries. Each entry of the data structure may have been previously created when the host port corresponding to the entry logged into the storage port corresponding to the entry. One or more multi-path drivers of the one or more host systems may send the plurality of heartbeat communications. It may be determined from the heartbeat communications that one or more combinations of a host port and a storage port do not have I/O connectivity currently enabled between the host port and storage device.

In some embodiments, a system of a storage network including one or more host systems coupled to the storage system may include one or more processors and a memory including code stored thereon that, when executed, performs the above-described method.

In some embodiments, one or more computer-readable media, for example, non-transitory computer-readable media, for a storage system of a storage network including one or more host systems coupled to the storage system has software stored thereon including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 6 is a block diagram illustrating an example of a plurality of logical layers of a combination of a host system and a data storage system for processing an I/O request, according to embodiments of the invention;

FIG. 8 is a block diagram illustrating an example of a data structure defining port connectivity permissions between a storage system and one or more host systems, according to embodiments of the invention;

FIG. 9 is a block diagram illustrating an example of a data structure defining port connectivity permissions for a switch, according to embodiments of the invention;

DETAILED DESCRIPTION OF EMBODIMENTS

Figure 1:
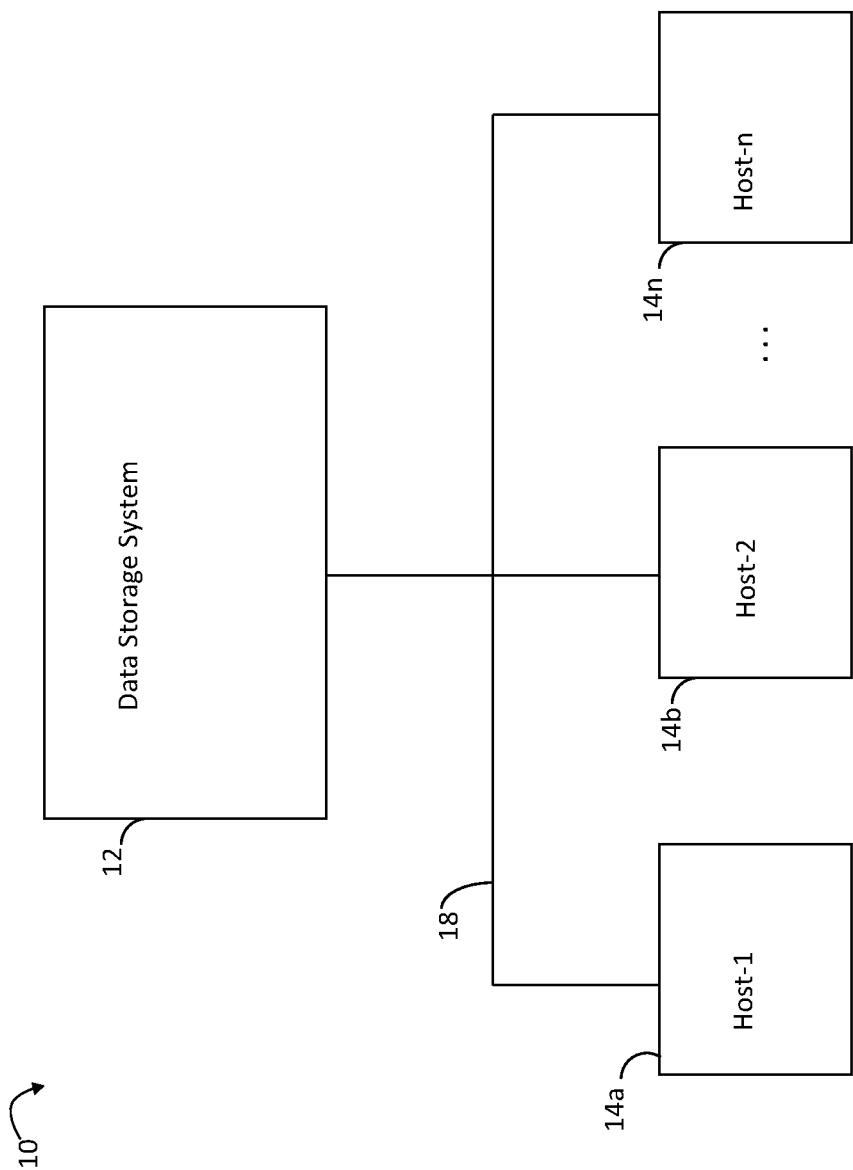
FIG. 1 is a block diagram illustrating an example of a system according to embodiments of the invention.

Storage systems may maintain data structures (e.g., masking tables) that define I/O connectivity in terms of storage devices, storage ports and host ports; i.e., which ports of a host system ("host ports"; e.g., SCSI initiators) are permitted to perform I/O communications with which storage devices (e.g., identified with, and sometimes referred to as, Logical Unit Numbers (LUNs)) over which ports of a storage system ("storage ports"; e.g., SCSI targets). Defining (including initially defining and later modifying) which host ports are permitted to perform I/O communications with which storage devices over which storage ports, for example, using a masking table or other data structure, may be referred to as configuring or defining I/O connectivity between a host port, storage port and storage device, or more simply as "masking."

To properly configure I/O connectivity between host ports, storage ports and storage devices, it may be necessary to know the permissible I/O paths between host ports and storage ports (e.g., across a switch fabric), which may be defined by zoning tables on one or more switches of a switch fabric. Switches may include zoning tables that define the logical connections between SHPs and SSPs of the switch; e.g., by specifying pairs of host port IDs (e.g., WWNs) and storage ports IDs (WWNs), each identified host port corresponding to a directly connected (e.g., by an FC cable) SHP of the switch and each identified storage port corresponding to a directly connected SSP of the switch. Thus, the zoning table defines permissible I/O paths between a host system and a storage system, each I/O path defined by (and including) a host port and a storage port. Such I/O paths may be referred to herein as "zoned I/O paths" or "enabled I/O paths," and the process of defining (including initially defining and later modifying) enabled I/O paths in a zoning table, or the resulting enabled I/O paths collectively, may referred to herein as "zoning."

A zoning table may be stored on a switch and under the control of a network administrator. In some cases, it may not be desirable or possible (e.g., at certain times) for a storage system and/or storage administrator to access the zoning table and/or network administrator to determine currently enabled I/O paths between a host system and a storage system. For this reason, when configuring a storage network, a zoning table may be configured to define permissible I/O paths between as many host ports of a host system as feasible (e.g., all host ports) and as many storage ports of a storage system as feasible (e.g., all storage ports), such that I/O connectivity for a storage device later can be defined (e.g., in a masking table) between any combination of storage port and host port without the need for any additional zoning work. However, such a zoning scheme may not scale well for storage networks including multiple (e.g., tens, hundreds or even thousands) of hosts, switches and/or storage systems. In other cases, zoning is performed more selectively, but in some cases may be done incorrectly; e.g., a host port is mistakenly zoned to the wrong storage port. A storage administrator may not be aware that zoning was done incorrectly, and may mistakenly believe that I/O communications are permitted between a host port and the correct storage port, and mask storage devices accordingly. Further, if a switch is reconfigured (e.g., re-zoned), the storage port to which a host port was mistakenly zoned may receive unnecessary notifications, for example, as part of an registered state change notification (RSCN) storm in accordance with a Fibre Channel (FC) technology.

Regardless of the zoning scheme, it may be desirable for the storage system and/or storage administrator to determine currently zoned I/O paths between a host system and storage system without accessing a zoning table and/or contacting a network administrator.

After a switch has been zoned during an initial configuration of a network, and perhaps later if a switch is rezoned, host ports may log into storage ports. A host port logging into a storage port may include the host port and storage port exchanging unique identifiers (e.g., WWNs) and other information, for example, in accordance with an FC protocol. The log-in process also may include the host port inquiring to the storage port about any storage devices available through the storage port, for example, by issuing a REPORT LUNS command in accordance with a SCSI protocol. The storage port may respond with a list of storage devices available to the host port through the storage port, for example, by providing a list of storage device identifiers (e.g., LUNs), after which host registration may be performed, which may include the host port providing host information to the storage port, including, for example: a host operating system (OS), OS level, host vendor and model, vendor unique (VU) commands used by the host, virtual machines (VMs) running on the host, and/or other host information.

During the log-in of a host port to a storage port, to determine storage devices available to the host port through the storage port, a masking table or the like for the storage system may be accessed to determine the I/O connectivity defined between the host port, storage port and storage devices of the storage system. In some cases, there may be no storage devices for which I/O connectivity has been defined for the host port and storage port. In such cases, it is known that a storage system may be configured to respond to the host port's inquiry with an ID of a fake (i.e., dummy or placeholder) storage device (e.g., a "LUNZ"), which may be referred to herein as a "nominal device." The storage system may respond with a nominal device ID (e.g., LUNZ ID) to allow the log-in process to complete and host registration to be performed. The storage system may be configured to respond to a limited set of commands from a host with respect to a nominal device (e.g., less than the full set of commands available for regular (i.e., non-pseudo) storage device. For example, for SCSI technology, this limited set of commands may include: REPORT LUNs, TEST UNIT READY (TUR), INQUIRY (INQ) and READ CAPACITY (RC), but not, for example, read and write commands, in response to which the storage system may respond that the nominal device does not exist.

During the login of a host port to a storage port, a log-in table may be updated. Each entry of the log-in table may represent and specify a host port and a storage port into which the host port logged. For ease of reference, this host port-storage port combination of each entry may be referred to herein as an I-T (initiator-target) pair, even though the invention is not limited to SCSI technology. Each log-in table entry may specify an I-T pair and other information pertaining to the I-T pair.

It may seem that the log-in table can serve as a resource to determine current zoning between a host system and storage system without having to access a switch or network administrator. However, the log-in table may not be accurate. For example, an unexpected failure or crash of a host, switch or storage system may result in a different network configuration after reboot that results in the loss of an I/O path between a host port and a storage port. Such failures may occur multiple times a week or even more frequently. Because of the unexpected nature of a failure, the log-in table entry for the I-T pair may still remain, giving the appearance that the I/O path is still zoned. Thus, the log-in table specifies I/O paths between a host port and storage port that existed at least at one point in time that may or may not currently exist.

Thus, a more reliable way to determine currently enabled I/O paths between a host system and storage system without accessing a zoning table and/or contacting a network administrator may be desired. Further, it may be desirable to determine enabled I/O paths between a host system and storage that are inactive—i.e., for which there is no defined I/O connectivity with any storage devices (i.e., no masking)—without accessing a zoning table and/or network administrator. That is, it may be desired to be able to determine I-T pairs on a storage network that are zoned, but not masked.

Described herein are a system and techniques for determining combinations of host ports and storage ports (e.g., I-T pairs) on a storage network that are zoned but not masked, without accessing a switch and/or contacting a network administrator. That is, the system and techniques described herein may determine, without accessing a switch or network administrator, I/O paths between host ports and storage ports that are enabled (e.g., as defined in a zoning table), but inactive in the sense that there are no storage devices for which I/O connectivity has been defined for the combination of the host port and storage port (e.g., per a masking table).

In some embodiments of the invention, heartbeat communications (heartbeats) may be transmitted (e.g., periodically) from host systems (e.g., per a multi-path driver thereof) to each storage device of a storage system of which the host system is aware, along the one or more I/O paths of which the host is aware to the storage port of the I/O path. The storage devices of which the host system is aware may include one or more nominal devices defined for I-T pairs for which I/O connectivity is not currently defined for any storage devices. In some embodiments of the invention, the storage system may communicate a list of the one or more nominal devices to the host system, and the host system may transmit heartbeats only to nominal devices. The heartbeat may be configured in accordance with a SCSI protocol, and may be, for example, implemented as a VU SCSI command.

The storage system may maintain a data structure referred to herein as a heartbeat table that may include a plurality of entries, each entry corresponding to a combination of a host port, a storage port and a storage device (e.g., a nominal device), and storing a time stamp value for a most recent heartbeat received for the combination. Other data structures (e.g., tables, indexes, linked lists) corresponding to heartbeats may be maintained, which may be created independently of, or derived from, the heartbeat table. For example, other data structures may include: a data structure storing, for each combination of host port, storage port and nominal device only, a time stamp value for a most recent heartbeat received for the combination; a data structure storing, for each combination of host port and storage port, a time stamp value for a most recent heartbeat received for the combination. One or more of the data structures described herein may be derived from a log-in table, for example, by adding a column for storing a last heartbeat to the log-in table itself or to a data structure derived from the log-in table.

The information in each of the foregoing data structures, or a subset thereof, may be sorted and/or displayed in a manner that facilitates determination of: formerly, but not currently, zoned I-T pairs; currently zoned and active I-T pairs; and currently zoned but inactive I-T pairs. For example, one or more of the data structures described herein may be sorted by: storage device ID (e.g., nominal device ID), host port ID, storage port ID, last heartbeat, other information, or any suitable combination of the foregoing.

An I-T pair may be determined to be formerly zoned but not currently zoned if, for all entries for the I-T pair, the time stamp value for a most recent heartbeat is too old; i.e., indicative that a heartbeat has not been issued for the I-T pair since a threshold point in time (which may be based on a predefined frequency or schedule of heartbeats), which may be determined to mean that the I-T pair is no longer zoned.

An I-T pair may be determined to be currently zoned and active if there is at least one table entry for a combination of the I-T pair and a non-nominal device for which the time stamp value for a most recent heartbeat is recent enough; i.e., indicative that a heartbeat has been issued for the combination since a threshold point in time, which may be determined to mean that the I-T pair is currently zoned.

An I-T pair may be determined to be currently zoned but inactive if there is at least one table entry for the I-T pair and a nominal device for which the time stamp value for a most recent heartbeat is recent enough; i.e., indicative that a heartbeat has been issued for the combination since a threshold point in time, which may be determined to mean that the I-T pair is currently zoned.

In some embodiments, a host port may not be configured to transmit heartbeats. In such embodiments, a data structure, for example, a heartbeat structure or other structure, may include an indication of whether a host port has the ability to transmit heartbeats, and this lack of capability may be taken into consideration when sorting data structure information and/or determining any of: formerly, but not currently, zoned I-T pairs; currently zoned and active I-T pairs; and currently zoned but inactive I-T pairs. In some embodiments, one or more separate data structures may be created for host ports without heartbeat capability.

Information from one or more of the foregoing data structures, in raw or sorted form, may be transmitted and shared between one or more components (e.g., hosts, storage systems, management components, other).

Illustrative embodiments of the invention will now be described in more detail in relation to the figures.

Referring now to FIG. 1, shown is an example of an embodiment of a system 10 according to some embodiments of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and also may communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, also may be located in different physical locations. Communication media that may be used to provide the different types of connections between the host computer systems and the data storage system of the system 10 may use a variety of different communication protocols such as, for example, SCSI, ESCON, Fibre Channel, iSCSI, FCoE, GIGE (Gigabit Ethernet), NVMeoF (NVMe over Fabric) and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2B:
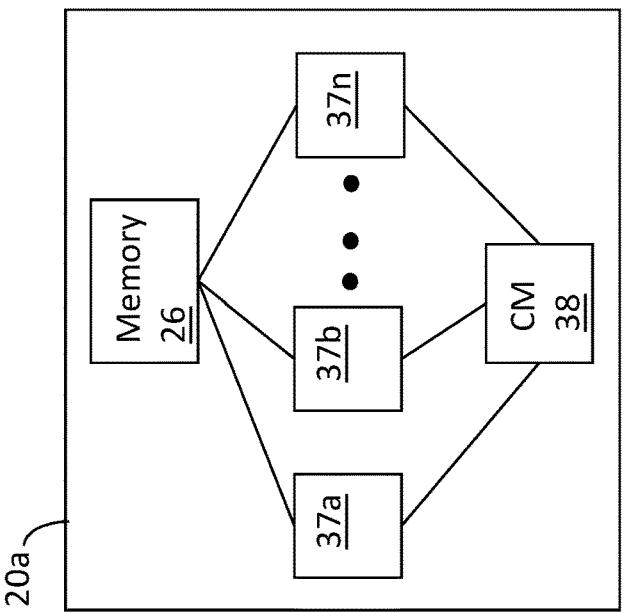
FIG. 2B is a block diagram illustrating an example of logical internal communications between directors and memory of the data storage system of FIG. 2A according to embodiments of the invention.
Figure 2A:
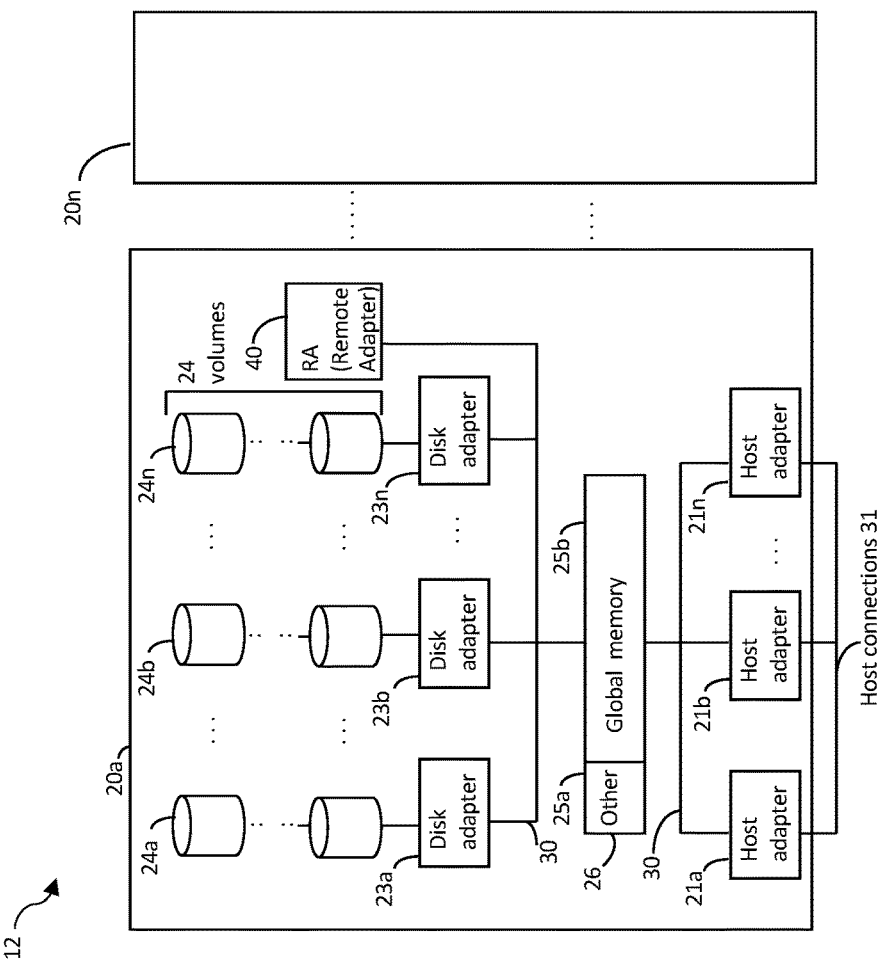
FIG. 2A is a block diagram illustrating an example of a data storage system according to embodiments of the invention.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of physical data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes. The system 20a also may include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting physical storage devices may be any suitable physical storage device such as a rotating disk drive, flash-based storage, and the like. The particular data storage system as described in this embodiment, or a particular physical storage device thereof, such as a rotating disk or solid-state storage device (SSD; e.g., a flash-based storage device), should not be construed as a limitation. Other types of commercially available data storage systems, as well as processors and hardware controlling access to these particular devices, also may be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems also may provide data to the host systems also through the channels. The host systems do not address the disk drives of the storage systems directly, but rather access to data may be provided to one or more host systems from what the host systems view as a plurality of LUNs. The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Referring to FIG. 2B, shown is a representation of the logical internal communications between the directors and memory included in a data storage system according to some embodiments of the invention. Included in FIG. 2B is a plurality of directors 37a-37n coupled to the memory 26.

Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host. The unqualified term "storage device" as used herein means a logical device or physical storage device.

Storage system 12 or one or more components thereof described in relation to FIGS. 1-2B may be implemented using one or more Symmetrix®, VMAX® or VMAX3® systems (hereinafter referred to generally as VMAX storage systems) made available from Dell EMC.

Figure 3:
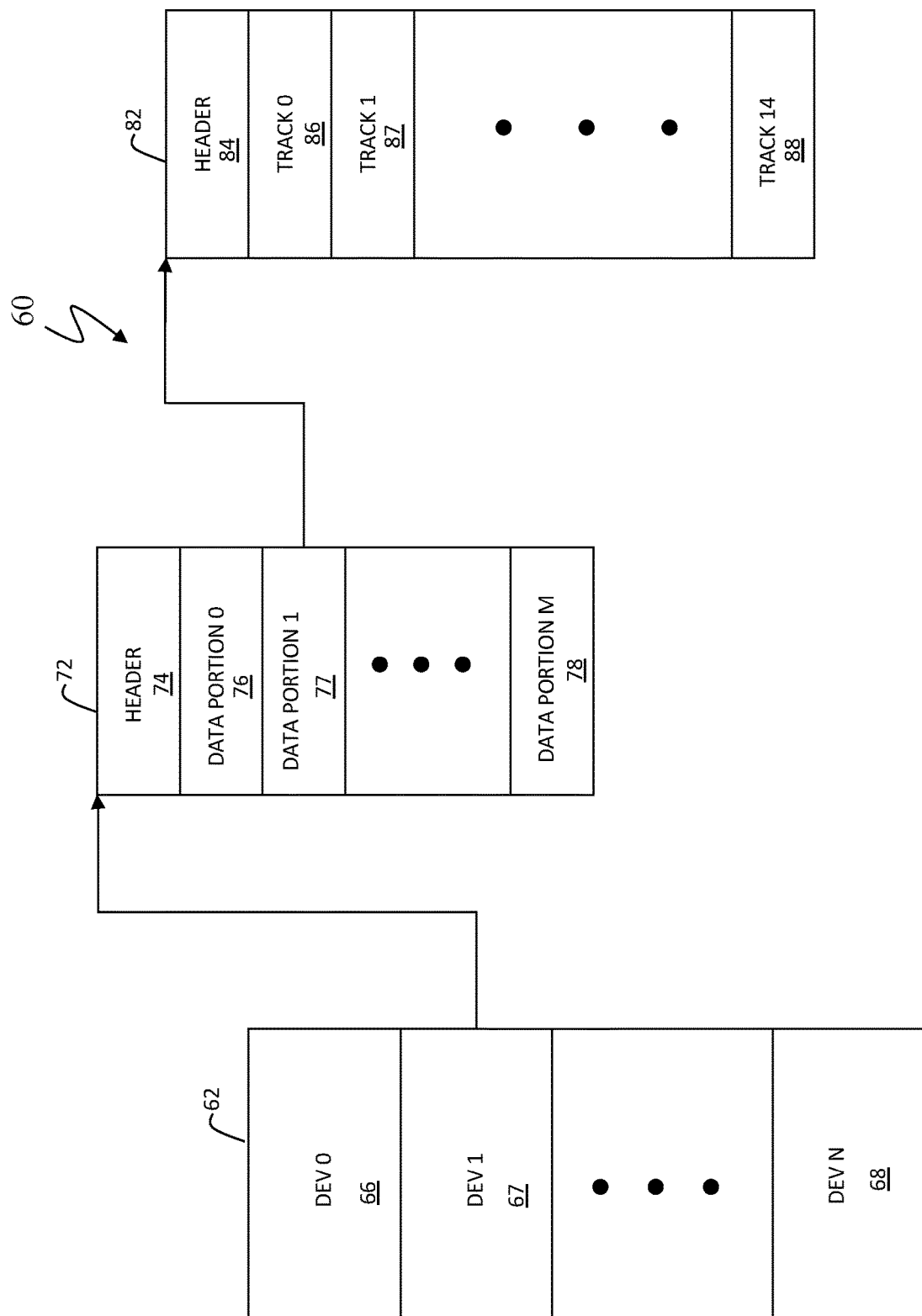
FIG. 3 is a block diagram illustrating an example of tables for keeping track of logical information associated with storage devices, according to embodiments of the invention.

FIG. 3 is a block diagram illustrating an example of tables 60 for keeping track of logical information associated with storage devices, according to embodiments of the invention. A first table 62 corresponds to all of the logical devices used by the storage system 24 or by an element of a storage system, such as an HA and/or a DA. The table 62 may include a plurality of logical device entries 66-68 that correspond to the logical devices used by the data storage system 24. The entries in the table 62 may include descriptions for standard logical devices, virtual devices, log devices, thin devices, and other types of logical devices.

Each of the entries 66-68 of the table 62 may correspond to another table that contains information for each of the logical devices. For example, the entry 67 may correspond to a table 72. The table 72 may include a header that contains overhead information. The table 72 also may include entries 76-78 for separate contiguous data portions of the logical device (e.g., a cylinder and/or a group of tracks). In an embodiment disclosed herein, a logical device may contain any number of data portions depending upon how the logical device is initialized. However, in other embodiments, a logical device may contain a fixed number of data portions.

Each of the data portion entries 76-78 may correspond to a track table. For example, the entry 77 may correspond to a track table 82 that includes a header 84 having overhead information. The track table 82 also includes entries 86-88 for each of the tracks. In an embodiment disclosed herein, there are fifteen tracks for every contiguous data portion. However, for other embodiments, it may be possible to have different numbers of tracks for each of the data portions or even a variable number of tracks for each data portion. For standard logical devices, the information in each of the entries 86-88 may include a pointer (either direct or indirect) to a physical address on one of the PDs 36a-36c of the storage system 24 (or a remote storage system if the system is so configured). Thus, the track table 82 may be used to map logical addresses of the logical device corresponding to the tables 62, 72, 82 to physical addresses on the PDs 36a-36c of the storage system e 24.

The tables 62, 72, 82 of FIG. 3 may be stored in the global memory 26 of the storage system 24 during operation thereof and may otherwise be stored in non-volatile memory (i.e., with the corresponding physical device). In addition, tables corresponding to logical devices accessed by a particular host may be stored in local memory of the corresponding one of the HA's 28a-28c. In addition, the RA's 32a-32c and/or the DA's 38a-38c may also use and locally store portions of the tables 62, 72, 82.

Figure 4:
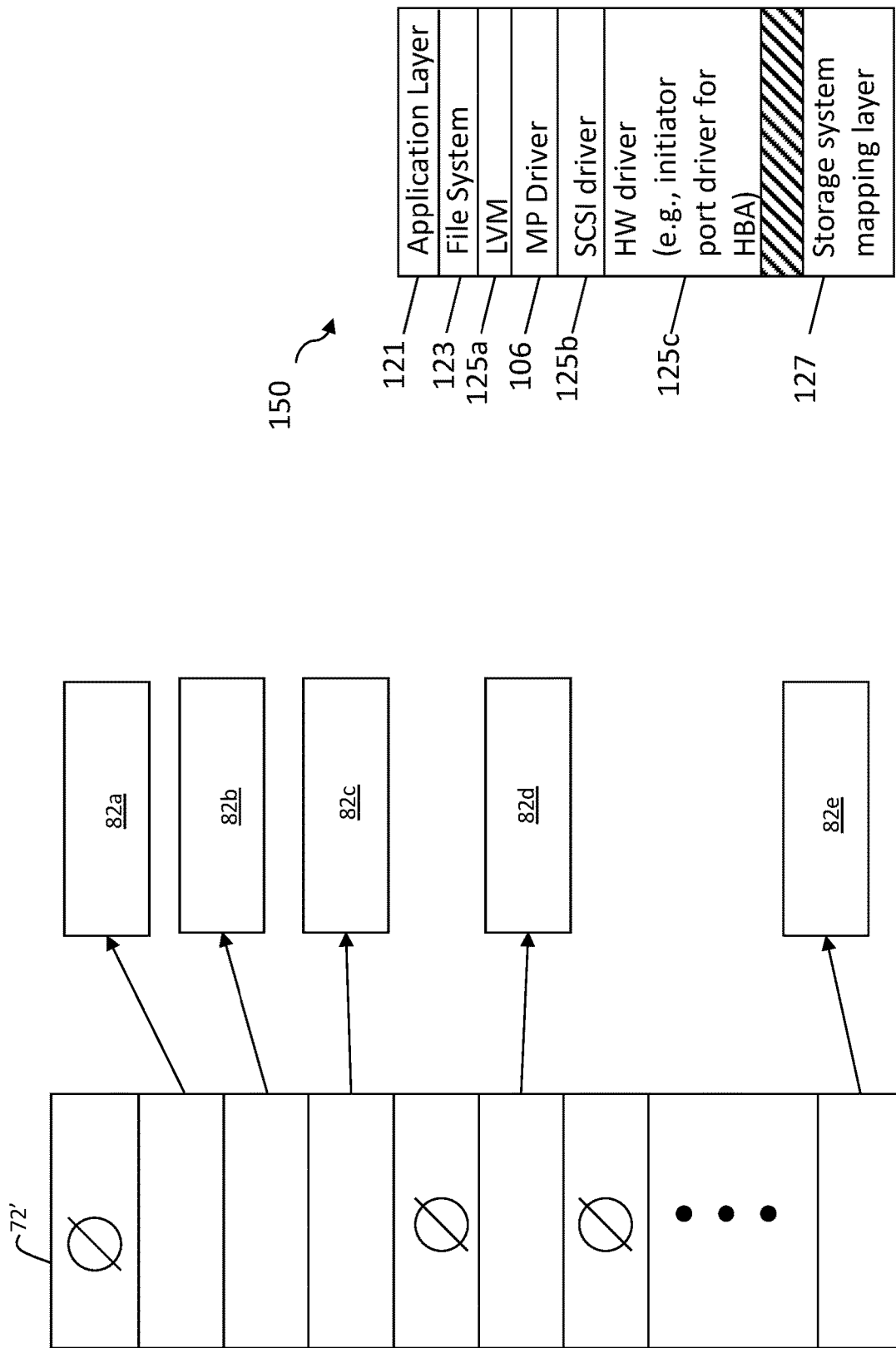
FIG. 4 is a diagram illustrating an example of a table used for a thin logical device, according to embodiments of the invention.

FIG. 4 is a diagram illustrating an example of a table 72' used for a thin logical device, according to embodiments of the invention, which may include null pointers as well as entries similar to entries for the table 72, discussed above, that point to a plurality of track tables 82a-82e. The thin logical device may be allocated by the system to show a particular storage capacity while having a smaller amount of physical storage that is actually allocated. When a thin logical device is initialized, all (or at least most) of the entries in the table 72' may be set to null. Physical data may be allocated for particular sections as data is written to the particular data portion. If no data is written to a data portion, the corresponding entry in the table 72' for the data portion maintains the null pointer that was written at initialization.

Figure 5:
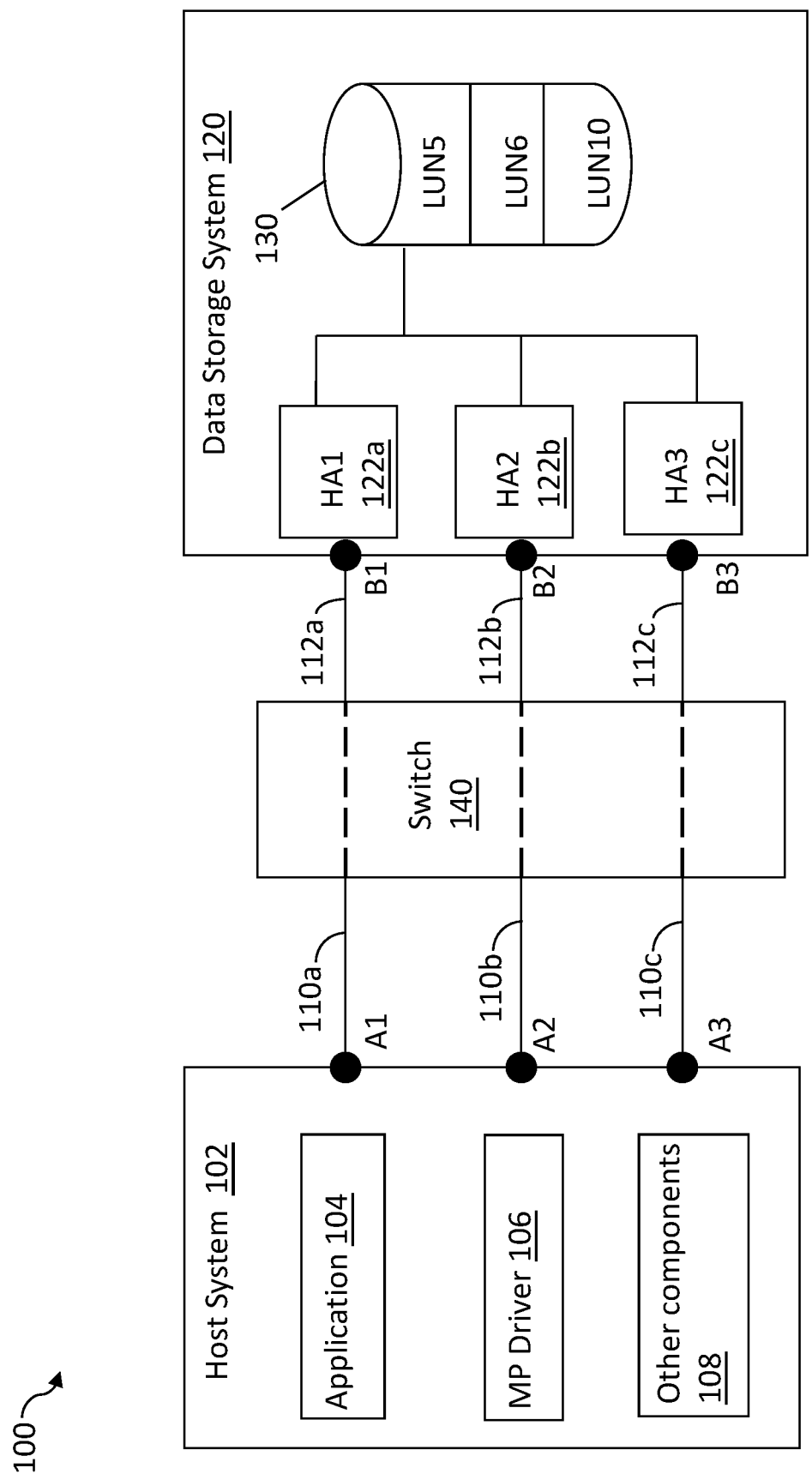
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 12 and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage device 130 may be configured to include three LUNs —LUN5, LUN6 and LUN10. It should be noted that the system 100 includes only a single host system 102, single physical device 130 with 3 LUNs, a single data storage system 120, and a single switch for purposes of simplicity to illustrate the techniques herein. For example, each of the LUNs may be configured to have storage provisioned from multiple different physical devices rather than a single physical device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LUNs of device 130, configured to be accessible to the host system 102 over multiple I/O paths. As such, each of the I/O operations may be forwarded from the application 104 to the data storage system 120 over one of the possible multiple I/O paths. The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical data storage devices, such as device 130, where each such physical device may be configured to store data of one or more LUNs. Each of the LUNs having data stored on the device 130 may be configured to be accessible to the host system 102 through one or more I/O paths. For example, all LUNs of 130 may be accessible using ports of the three front-end directors or interfaces 122a-122c, also denoted respectively HA1, HA2 and HA3. The multiple I/O paths allow the application I/Os to be routed over multiple I/O paths and, more generally, allow the LUNs of device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LUNs of the device 130 in order to determine which of the multiple I/O paths are active or available at a point in time, which of the multiple I/O paths are unavailable for communications, and to use such information to select an I/O path for host system-data storage system communications.

In the example of the system 100, each of the LUNs of the device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LUNs of the device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 5) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host system may perceive as corresponding to a physical device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping a LUN (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LUN known or exposed to the host system may not directly correspond to a physical device such as a disk drive. In such embodiments, the LUN specified by the host system in the I/O operation may be further mapped by the data storage system using its mapping layer 127. For example, a LUN specified by the host system may be mapped by the data storage system to one or more physical drives, and multiple LUNs may be located on a same physical device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125*a*) or files (implemented using the file system 123), whereby such I/O requests may be directed to LUNs of the data storage system. Such I/O operations from the application layer 121 may be directed to the MP driver 106 after passing through any intervening layers such as, for example, the layers 123 and 125*a*. Communications between an initiator port of the host system and a target port of a data storage system (e.g., target port of an HA) may include those related to I/O operations and other non-I/O commands such as related to host system control operations. I/O operations may include, for example, read and write operations with respect to data stored on a LUN.

In connection with a SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an HA (e.g., such as B1-B3 of FIG. 5) in the data storage system. Through each such I/O path, one or more LUNs may be visible or exposed to the host system initiator through the target port of the data storage system.

Figure 7:
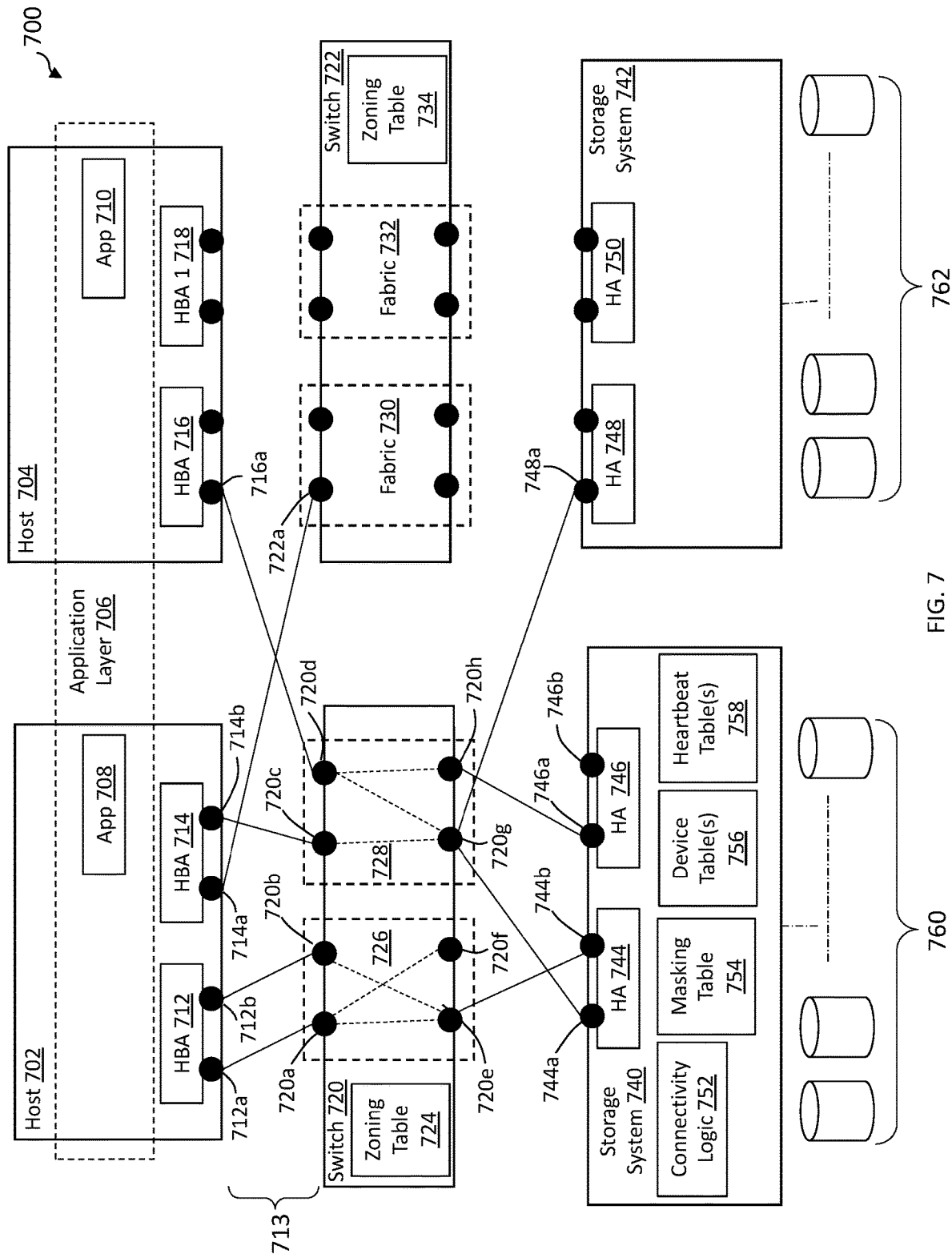
FIG. 7 is a block diagram illustrating an example of a storage network, according to embodiments of the invention.

FIG. 7 is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; physical storage devices 760 and 762; other components; or any suitable combination of the foregoing. It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represents the collective applications layers of the software stacks of hosts 702 and 704, each of which may be an application layer 121 as described in relation to FIG. 6.

Host 702 may include any of: a portion of the application layer at 706; application 708; HBAs 712 and 714; and host ports 712*a*, 712*b*, 714*a* and 714*b*. The portion of application layer 706 running on host 702 may include application 708 and one or more other applications. HBA 712 may include host ports 712*a* and 712*b*, and HBA 714 may include host ports 714*a* and 714*b*. HBAs 712 and 714 each may be separate discrete logical or physical components of host 702, and host 702 may include more than the two HBAs illustrated. Each of the host ports 712*a*, 712*b*, 714*a* and 714*b* may be connected to an SHP (i.e., fabric port) of switch 720 or 722 by physical connections 713. Each such physical connection may be a cable and, in some embodiments, there is only enabled one physical connection between each host port and fabric port (e.g., in accordance with a technology standard (e.g., FC)) as illustrated in FIG. 7. That is, in some embodiments, each fabric port is dedicated to one host port. Host 704 may include any of: a portion of the application layer at 706; application 710; HBAs 716 and 718; and multiple host ports including host port 716*a* of HBA 716.

FIG. 7 illustrates host ports 712*a*, 712*b*, 714*a*, 714*b* and 716*a* connected to fabric ports over physical connections 713 in which there is only one physical connection 713 between each host port and each fabric port.

Switch 720 may include any of: zoning table 724, fabrics 726 and 728; ports 720*a-h*; other components; or any suitable combination of the foregoing. Zoning table 724 may be a data structure that defines which host ports (as defined by a unique identifier such as a WWN), e.g., corresponding to host ports 712*a*, 712*b*, 714*a*, 714*b* and 7116*a*, are enabled to communicate with which storage system (e.g., HA) ports, for example, 744*a*, 744*b*, 746*a*, 746*b* and 748*a*. The switch 720 may use the information in the zoning table 724 to determine the internal switch connections between fabric ports and SSPs to implement the defined zones, as illustrated by the dashed lines within switch 720 in FIG. 7. Zoning table 724 or another data structure on switch 720 may define one or more fabrics, including fabrics 726 and 728, for example, by specifying the switch ports that are members of the fabrics, as described in more detail elsewhere herein. For example, a data structure on switch 720 or elsewhere may define that fabric 726 includes ports 720*a*, 720*b*, 720*e* and 720*f*. Switch 722 may include any of: zoning table 734, fabrics 730 and 732; several ports including port 722*a*; other components; or any suitable combination of the foregoing. Each of switches 720 and 722 may be a switch 140 described in relation to FIG. 5 or include any of the components thereof described herein. In some embodiments, one or both of switches 720 and 722 may be a Dell EMC Connectrix™ switch or director made available by Dell EMC.

Storage system 740 may include any of: connectivity logic 752; masking table 754; device table(s) 756; heartbeat table(s) 758; HAs 744 and 746; storage ports 744*a*, 744*b*, 746*a* and 746*b*; other components; and any suitable combination of the foregoing. Device table(s) 756 may define properties of storage devices of the storage system 740, including logical devices (which may include thin devices) corresponding to physical storage devices 760, as described in more detail elsewhere herein. Masking table 754 may define which host ports (e.g., 712*a*, 712*b*, 714*a*, 714*b*, 716*a*) are permitted to communicate with which storage devices over which storage ports (e.g., 744*a*, 744*b* 746*a*, 746*b*). Heartbeat table(s) 758 may include one or more data structures that include heartbeat information for I/O paths including various combinations of host ports, storage ports and/or storage devices (including nominal devices) as is described in more detail elsewhere herein. Connectivity logic 752 may be configured with logic (software, hardware, firmware or a combination thereof) to perform one or processes in accordance with I/O connectivity on a storage network, for example, one or more of the methods described herein, or sub-steps thereof, relating to heartbeat communications. Storage system 742 may include any of the same or similar components as storage system 740, including HA 748 and storage port 748*a* thereof. In some embodiments, storage systems 740 and/or 742 may be a storage system 20*a* and/or 120 described in relation to FIGS. 2A and 5, respectively, or include one more components and/or functionality thereof.

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table (e.g., masking table 754). Data structure 800 may include a plurality of entries 810, each entry representing a storage device identified in column 802 and specifying a host port (e.g., by WWN) in column 804 with which the identified storage device is enabled to communicate I/O over the storage port identified in column 806. Other information, for example, the host and/or the HBA associated with the host port and/or the HA associated with the storage port may be specified in column 808. A data structure other than a table, for example, a linked list and/or object-oriented data structure, may be used to record the same information.

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. Data structure 900 may be a zoning table, and may include a plurality of entries 910, each entry representing an initiator port (e.g., a host port) in column 902 and a target port (e.g., a storage port) in column 904 with which the initiator port may communicate over a fabric. Other information, for example, host, HBA, HA, fabric name, etc. may be specified in column 906. A data structure other than a table, for example, a linked list and/or object-oriented data structure, may be used to record the same information.

Figure 10:
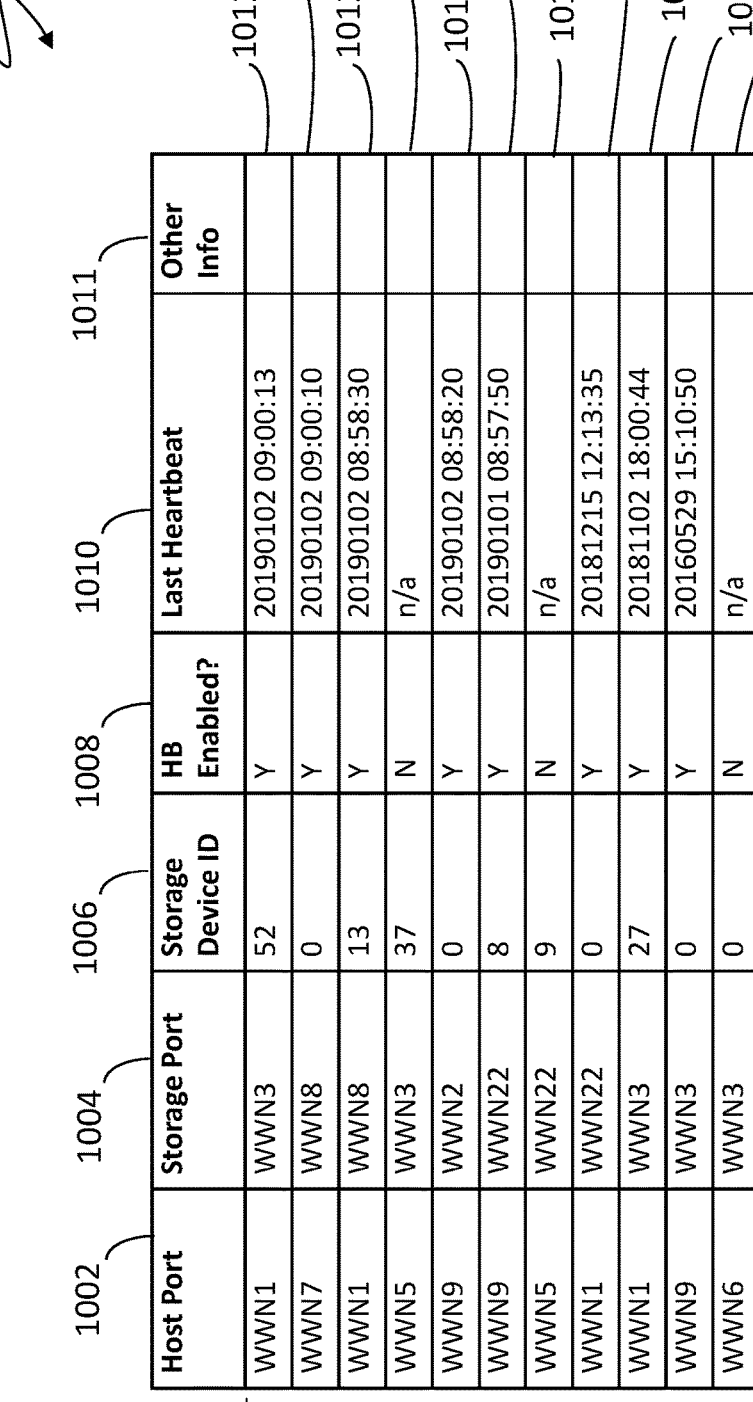
FIG. 10 is a block diagram illustrating an example of a data structure including heartbeat information for I/O paths, according to embodiments of the invention.

FIG. 10 is a block diagram illustrating an example of a data structure 1000 including heartbeat information for I/O paths, according to embodiments of the invention. Other embodiments of a data structure including heartbeat information for I/O paths, for example, variations of data structure 1000, are possible and are intended to fall within the scope of the invention. Data structure 1000 may be used for one of heartbeat table(s) 758 described in relation to FIG. 7 above. The information in data structures 1000 may be compiled from data found in one or more other data structures, for example, data structures 800 and/or a log-in table, for example, initially when a host system logs into a storage system and later in response to heartbeats. Data structure 1000 may be referred to herein as heartbeat table 1000.

FIG. 10 may include a plurality of entries 1012, each entry corresponding to a combination of a host port, storage port and storage device identified in host port ID column 1002, storage port ID column 1004 and storage device 1006, respectively. Each storage device may be an actual storage device or a nominal device. A storage system may be configured to use a certain ID or ID format for nominal devices. For example, one or more (e.g., all) nominal devices may be given a same value reserved for nominal devices, e.g., the number "0" used for entries 1012*b, e, h, j* and *k* in heartbeat table 1000. The same ID (e.g., name or number) may be used for all nominal devices as no I/O will ever be written to/from the nominal device. However, in some embodiments, it may be desirable to use a different ID value for each nominal device to be able to distinguish between nominal devices for different host ports and/or storage ports, and manage and track them. For example, all nominal device IDs may begin with a same one or more reserved digits or characters.

Each entry may specify, in column 1008, whether the host port identified in host port ID column 1002 supports transmitting heartbeats. For example, the host system including the host port may include an MP driver (e.g., 106) that is configured to send heartbeats as described herein, or not configured to do so, and this may be reflected in column 1010. For example, entries 1012*a, b, c, e, f, h, i* and *j* correspond to host ports enabled to transmit heartbeats, and entries 1012 *d, g* and *k* correspond to host ports no so enabled.

If the host port identified in column 1002 is enabled to transmit heartbeats, a most recent heartbeat transmitted from the host port to the storage port identified in column 1004 for the storage device identified in column 1006 may be stored in last heartbeat column 1010. For each of entries 1012, other information for the identified host port, storage port and storage device may be stored in column 1011.

Other data structures (e.g., tables, indexes, linked lists) corresponding to heartbeats may be maintained, which may be created independently of, or derived from, the heartbeat table 1000. For example, a data structure may maintain most recent heartbeats only for nominal devices, which would include, for example, entries 1012*b, e, h, j* and *k* from heartbeat table 1000, but not entries 1012*a, c, d, f, g* and *i*. In some embodiments, a data structure maintains, for each combination of host port and storage port, a time stamp value for a most recent heartbeat received for the combination. That is, such a data structure does not include a storage device ID, and a separate data structure may map storage devices, or only nominal devices, to host port-storage port combinations in such a data structure. Other separate tables or other type of data structures (e.g., index, linked list, object-oriented data structure) may be maintained for one or more combinations of two or more of the columns of table 1000, and each such data structure may include information from the remaining columns of table 1000 for each such combination.

In some embodiments, one or more of the data structures described herein, including heartbeat table 1000, may be derived from a log-in table. As described in more detail elsewhere herein, a log-in table may include a plurality of entries, each entry corresponding to an I-T pair for which an I/O path was enabled (e.g., zoned) at least at one point in time, which may or may not still be enabled. One or more columns, including a most recent heartbeat and other information, may be added to a respective entry of the log-in table itself, or a new data structure (e.g., heartbeat table 1000 or any of the other data structures described herein) derived from the log-in table may be created.

In some embodiments, a host port (e.g., 712*a*, 712*b*, 714*a*, 714*b*, 716*a*) may not be configured to transmit heartbeats, and a storage system (e.g., 740, 742) may be configured with this knowledge. In such embodiments, a data structure, for example, a heartbeat structure 1000 (e.g., 758) or other structure described herein, may include an indication of whether a host port has the ability to transmit heartbeats, and this lack of capability may be taken into consideration when sorting data structure information and/or determining any of: formerly, but not currently, zoned I-T pairs; currently zoned and active I-T pairs; and currently zoned but inactive I-T pairs, as described in more detail elsewhere herein. In some embodiments, one or more separate data structures, including variations of any of the data structures described herein, may be created for: host ports without heartbeat capability only; and/or host ports with heartbeat capability.

The information in data structure 1000 and any other data structures described herein may be sorted according to values in any of a variety of combinations of columns of the data structure. For example, information in table 1000 may be sorted by any combination of: storage device ID (e.g., nominal device ID), host port ID, storage port ID, last received heartbeat, whether heartbeats are enabled for the host port, and other information.

Figure 11:
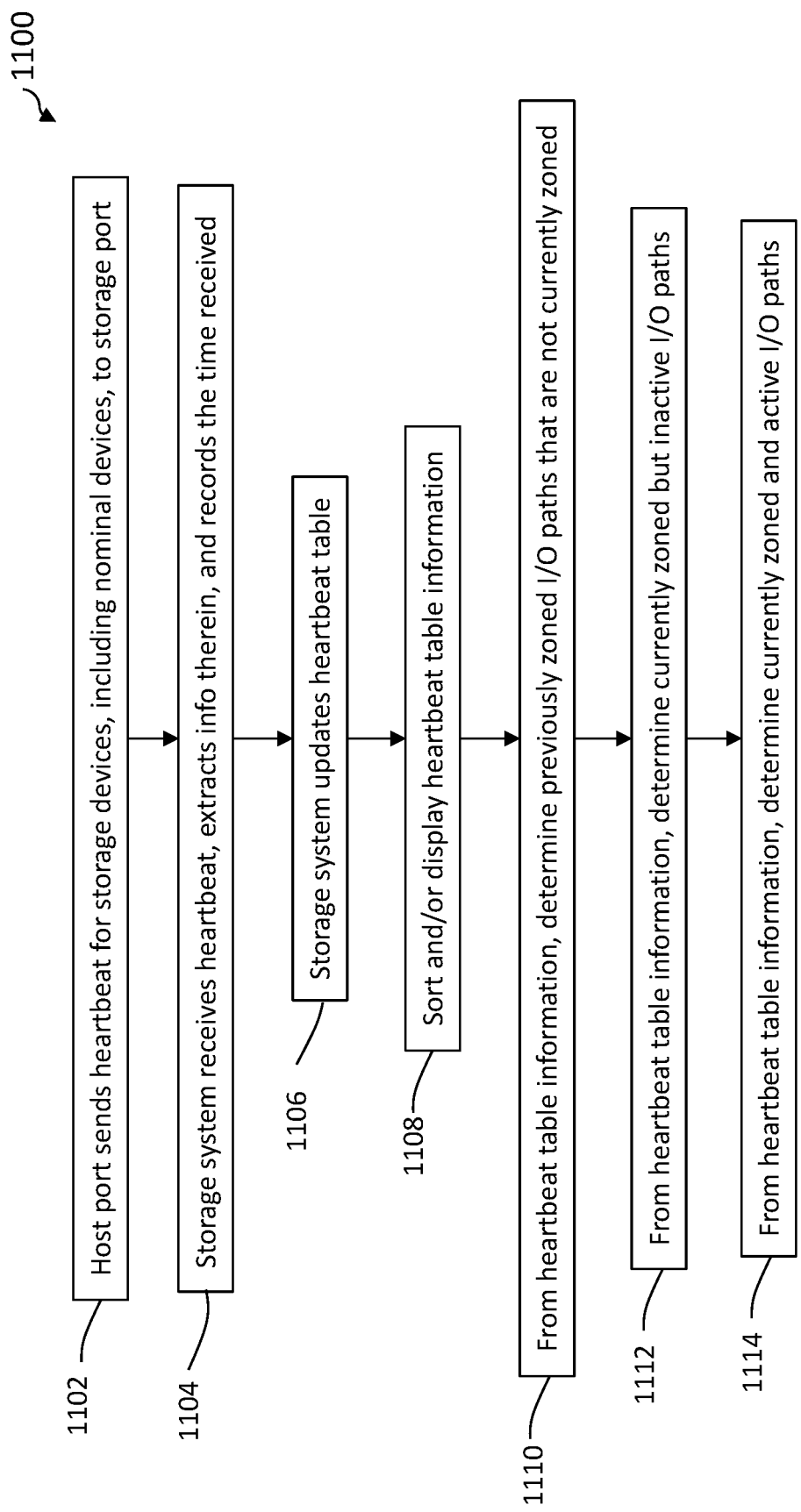
FIG. 11 is a flow chart illustrating an example of a method of determining I/O connectivity information for one or more I/O paths, according to embodiments of the invention.

FIG. 11 is a flow chart illustrating an example of a method 1100 of determining I/O connectivity information for one or more I/O paths, according to embodiments of the invention. Other embodiments of a method of determining I/O connectivity information for one or more I/O paths, for example, variations of method 1100, are possible and are intended to fall within the scope of the invention. One or more of the steps of method 1100, for example, any of steps 1104-1114, may be performed by connectivity logic 752.

In step 1102, for one or more storage devices (e.g., 760, 762 and nominal devices), a host port (e.g., 712*a*, 712*b*, 714*a*, 714*b*, 716*a*) may send a heartbeat for the storage device to a storage port (e.g., 744*a*, 744*b*, 746*a*, 746*b*, 748*a*). For example, an MP driver (e.g., 106) or another component of a host may be configured with knowledge of all I/O paths between a host and a storage device, each of which I/O path includes a host port and storage port. The MP driver may be configured to send heartbeats along every such I/O path, for example, according to a schedule, periodically and/or in response to an event (e.g., user input). In some embodiments, the heartbeat is configured in accordance with a SCSI protocol, and may be, for example, implemented as a VU SCSI command.

In some embodiments of the invention, the storage system may store, and/or be configured with access to, a list of nominal devices for each storage port. The storage system may be configured to communicate the nominal device list(s) to one or more host systems. The host system (e.g., an MP driver or other component thereof) may be configured to receive and record nominal device lists, and may send heartbeats only for nominal devices.

In step 1104, the storage system may receive the heartbeat, extract the information therein, and record the time at which the heartbeat was received. The extracted information therein may include the host port ID (e.g., WWN), storage port ID (e.g., WWN) and the ID of a storage device ID, which may be a nominal device. As described in more details elsewhere herein, for SCSI technology, a storage system may be configured to recognize a limited set of SCSI commands, and perform I/O operations in response thereto, for nominal devices, which may include, for example the following SCSI commands: REPORT LUNs, TEST UNIT READY (TUR), INQUIRY (INQ) and READ CAPACITY (RC), but not, for example, read and write commands, in response to which the storage system may respond that the nominal device does not exist. In some embodiments of the invention in which SCSI technology is employed, a storage system may be configured to recognize and respond to a limited set of SCSI commands for nominal devices, the limited set including heartbeats. For example, a storage device may be configured to recognize a VU SCSI heartbeat command, and, in response thereto, perform one or more I/O operations and/or steps 1104-1114 or parts thereof.

In step 1106, the storage system 1106 may update one or more heartbeat tables (e.g., 758), for example, heartbeat table 1000 or any of the other data structures described herein, with information extracted from the heartbeat received in step 1104 and the time at which the heartbeat was received, e.g., recorded in step 1104.

In step 1108, information from the one or more heartbeat tables may be sorted and/or displayed, for example, as described in more detail herein. For example, such information, or a subset of information therein, may be sorted and/or displayed in a manner that facilitates determination of: formerly, but not currently, zoned I-T pairs; currently zoned and active I-T pairs; and currently zoned but inactive I-T pairs. For example, one or more of the data structures described herein may be sorted or displayed by: storage device ID (e.g., nominal device ID), host port ID, storage port ID, most recent last heartbeat, other information, or any suitable combination of the foregoing.

In step 1110, from heartbeat information, it may be determined whether there are one or more formerly zoned I/O paths that are no longer zoned (e.g., not currently masked for any storage device). For example, an I-T pair may be determined to be formerly zoned but not currently zoned if, for all entries for the I-T pair in a heartbeat table (e.g., table 1000), the time stamp value for a most recent heartbeat is too old. That is, one or more entries may exist in a heartbeat table for an I-T pair because at one point in time the I-T pair was zoned. For example, the heartbeat table may be derived from a log-in table, and, based on a zoning table, the host port (initiator) may have been logged into the storage port (target) and one or more entries made in the log-in table and/or heartbeat table derived therefrom. Even if no storage devices were ever masked to the I-T pair, a nominal device may have been created for the I-T pair during a log-in process, and an entry made in the log-in table and/or heartbeat table derived therefrom. One or more heartbeats may have been recorded in the heartbeat table for the nominal device and/or any storage devices that were previously masked to the I-T pair. However, after one or more heartbeats were recorded, the zoning table may have been updated and/or one or more physical connections (e.g., FC cables) between the host port and storage port (e.g., to a switch fabric therebetween) disconnected such that there is no longer any I/O path between the I-T pair. As a result, after no I/O path is enabled between a host port and a storage port, no more heartbeat communications may be transmitted from the host port to the storage port, for example, by an MP driver who has knowledge of all I/O paths between a host and storage device.

The threshold point in time may be based at least in part on one or more schedules of heartbeats from one of more host ports. For example, an MP driver of a host may be configured to initiate sending heartbeats for all I/O paths of which it is aware once every hour, and the threshold point in time may be one hour prior to the performance of step 1110. Thus, if a time stamp value has not been recorded for any entry in the heartbeat table for an I-T pair in a last hour, it may be determined that the I-T pair is no longer zoned. In some embodiments, a threshold point in time may be configured to allow one or more missed heartbeat communications, for example, giving consideration that a heartbeat may not have been transmitted and/or received for a reason other than the I-T pair no longer being zoned, for example, because of a communication error, temporary system (or component thereof) failure or a physical connection being temporarily disconnected. For example, if heartbeats are initiated once every hour, the threshold point in time may be greater than one hour before performance of step 1112, e.g., two or more hours before such performance.

In step 1112, it may be determined from heartbeat information whether there are one or more currently zoned but inactive I/O paths (e.g., not currently masked for any storage device). For example, an I-T pair may be determined to be currently zoned but inactive if there is at least one entry in a heartbeat table (e.g., table 1000) for a combination of the I-T pair and a nominal device, for which the time stamp value for a most recent heartbeat is recent enough; i.e., indicative that a heartbeat has been issued for the combination since a threshold point in time, which may be determined to mean that the I-T pair is currently zoned. In some embodiments, as an alternative or in addition to determining whether there is at least one entry in a heartbeat table for the combination of the I-T pair and the nominal device, for which the time stamp value for a most recent heartbeat is recent enough, it may be determined whether the I-T pair is currently zoned and active, as described in relation to step 1114. This alternative or additional determination may be done in case a storage device that previously did not have any masked storage devices has been masked to an FT pair since the threshold point in time and after a last heartbeat was received for a nominal device of the I-T pair.

There may be any of a variety of reasons for the existence of a currently zoned but inactive I/O path between a host port and a storage port. For example, an I/O path may have been incorrectly zoned by a network administrator such that the storage administrator has not masked any storage devices to the I/O path. Conversely, a storage administrator may have mistakenly masked one or more storage device to a wrong I-T pair. Further, the storage network may have been intentionally over-zoned to avoid the need to update zoning tables and/or contact a network administrator every time a storage device is masked to an I-T pair for which there are no other storage devices currently masked. Further investigation may be required to determine the reason. In the event the reason is a zoning or masking error, the error may be corrected by updating a zoning table or masking table, respectively. Correcting the error may address other problems arising therefrom, for example, one or more storage ports being unnecessarily subjected to an RSCN storm.

In step 1114, it may be determined from heartbeat information whether there are one or more currently zoned and active I/O paths (e.g., currently masked for a storage device). It may be determined whether an I-T pair is currently zoned and active if there is at least one table entry for a combination of the I-T pair and a non-nominal device for which the time stamp value for a most recent heartbeat is recent enough; i.e., indicative that a heartbeat has been issued for the combination since a threshold point in time, which may be determined to mean that the I-T pair is currently zoned. It should be appreciated that whether I/O paths are zoned and active may be determined in any of a variety of other ways, for example, by monitoring I/O operations received at storage ports.

It should be appreciated that the order of performance of the steps of method 1100 are not limited to the order illustrated in FIG. 11, and that some steps or portions thereof may be performed in parallel with other steps or portions thereof. For example, any of steps 1102-1106 or portions thereof may be performed for one or more heartbeats, while any of steps 1108-1114 or portions thereof are performed concurrently for already received heartbeats.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 1100, or parts thereof, may be implemented using one or more of the systems, data structures and/or displays described in relation to FIGS. 1-10 or components thereof. Further, various aspects of the invention may be implemented using software, hardware, a combination of software and hardware and/or other computer-implemented modules or devices having the described features and performing the described functions.

Software implementations of embodiments of the invention may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage network including one or more host systems coupled to a storage system having a plurality of storage devices, a method comprising:
receiving a plurality of heartbeat communications at one or more storage ports of the storage system from the one or more host systems, each heartbeat communication indicative of current I/O connectivity between a combination of a respective host port of the one or more host systems and a respective one of the storage ports; and
determining from the heartbeat communications that, for each of one or more combinations of a host port and a storage port defining an I/O path: the combination has I/O connectivity currently enabled between the host port and the storage port on the I/O path, but no I/O connectivity currently enabled for any one of the plurality of storage devices over the I/O path defined between the host port and the storage port.

2. The method of claim 1, further comprising:
maintaining a first data structure on the storage system, the first data structure including a plurality of entries, each entry corresponding to a combination of a storage port of the storage system and a host port of one of the one or more host systems between which I/O connectivity has been enabled at least at one point in time; and
in response to each heartbeat communication for each at least first combination, updating an entry of the first data structure that corresponds to the at least first combination with a time stamp value corresponding to a time at which the heartbeat communication was received at one of the storage ports,
wherein the determining includes determining from the first data structure that one or more combinations of a host port and a storage port have I/O connectivity currently enabled between the host port and storage device, but no I/O connectivity currently enabled between the host port and storage device for any of the plurality of storage devices.

3. The method of claim 2, wherein maintaining the first data structure includes recording, for each combination of a host port and a storage port having an entry in the data structure, a time stamp value of a last heartbeat communication, if any, received for each combination.

4. The method of claim 2, further comprising:
sorting two or more of the plurality of entries based at least in part on the time stamp values of the two or more entries.

5. The method of claim 2, wherein each entry of the data structure was previously created when the host port corresponding to the entry logged into the storage port corresponding to the entry.

6. The method of claim 1, further comprising:
one or more multi-path drivers of the one or more host systems sending the plurality of heartbeat communications.

7. The method of claim 1, further comprising:
determining from the heartbeat communications that one or more combinations of a host port and a storage port do not have I/O connectivity currently enabled between the host port and storage device.

8. A storage system of a storage network including one or more host systems coupled to the storage system, the storage system comprising:
a plurality of storage devices;
one or more processors; and
a memory comprising code stored thereon that, when executed, performs a method comprising:
receiving a plurality of heartbeat communications at one or more storage ports of the storage system from the one or more host systems, each heartbeat communication indicative of current I/O connectivity between a combination of a respective host port of the one or more host systems and a respective one of the storage ports; and
determining from the heartbeat communications that, for each of one or more combinations of a host port and a storage port defining an I/O path: the combination has I/O connectivity currently enabled between the host port and the storage port on the I/O path, but no I/O connectivity currently enabled for any one of the plurality of storage devices over the I/O path defined between the host port and the storage port.

9. The system of claim 8, the method further comprising:
maintaining a first data structure on the storage system, the first data structure including a plurality of entries, each entry corresponding to a combination of a storage port of the storage system and a host port of one of the one or more host systems between which I/O connectivity has been enabled at least at one point in time; and
in response to each heartbeat communication for each at least first combination, updating an entry of the first data structure that corresponds to the at least first combination with a time stamp value corresponding to a time at which the heartbeat communication was received at one of the storage ports,
wherein the determining includes determining from the first data structure that one or more combinations of a host port and a storage port have I/O connectivity currently enabled between the host port and storage device, but no I/O connectivity currently enabled between the host port and storage device for any of the plurality of storage devices.

10. The system of claim 9, wherein maintaining the first data structure includes recording, for each combination of a host port and a storage port having an entry in the data structure, a time stamp value of a last heartbeat communication, if any, received for each combination.

11. The system of claim 9, the method further comprising:
sorting two or more of the plurality of entries based at least in part on the time stamp values of the two or more entries.

12. The system of claim 9, wherein each entry of the data structure was previously created when the host port corresponding to the entry logged into the storage port corresponding to the entry.

13. The system of claim 8, the method further comprising:
one or more multi-path drivers of the one or more host systems sending the plurality of heartbeat communications.

14. The system of claim 8, the method further comprising:
determining from the heartbeat communications that one or more combinations of a host port and a storage port do not have I/O connectivity currently enabled between the host port and storage device.

15. One or more non-transitory computer-readable media for a storage system of a storage network including one or more host systems coupled to the storage system, wherein the storage system includes a plurality of storage devices and the computer-readable media has software stored thereon defining a method, the software comprising:
executable code that receives a plurality of heartbeat communications at one or more storage ports of the storage system from the one or more host systems, each heartbeat communication indicative of current I/O connectivity between a combination of a respective host port of the one or more host systems and a respective one of the storage ports; and
executable code that determines from the heartbeat communications that, for each of one or more combinations of a host port and a storage port defining an I/O path: the combination has I/O connectivity currently enabled between the host port and the storage port on the I/O path, but no I/O connectivity currently enabled for any one of the plurality of storage devices over the I/O path defined between the host port and the storage port.

16. The one or more non-transitory computer-readable media of claim 8, the software further comprising:
executable code that maintains a first data structure on the storage system, the first data structure including a plurality of entries, each entry corresponding to a combination of a storage port of the storage system and a host port of one of the one or more host systems between which I/O connectivity has been enabled at least at one point in time; and
executable code that, in response to each heartbeat communication for each at least first combination, updates an entry of the first data structure that corresponds to the at least first combination with a time stamp value corresponding to a time at which the heartbeat communication was received at one of the storage ports,
wherein the executable code that determines includes executable code that determined from the first data structure that one or more combinations of a host port and a storage port have I/O connectivity currently enabled between the host port and storage device, but no I/O connectivity currently enabled between the host port and storage device for any of the plurality of storage devices.

17. The one or more non-transitory computer-readable media of claim 16, wherein executable code that maintains the first data structure includes executable code that records, for each combination of a host port and a storage port having an entry in the data structure, a time stamp value of a last heartbeat communication, if any, received for each combination.

18. The one or more non-transitory computer-readable media of claim 16, wherein each entry of the data structure was previously created when the host port corresponding to the entry logged into the storage port corresponding to the entry.

19. The one or more non-transitory computer-readable media of claim 15, the software further comprising:
   executable code of one or more multi-path drivers of the one or more host systems that send the plurality of heartbeat communications.

20. The one or more non-transitory computer-readable media of claim 15, the software further comprising:
   executable code that determines from the heartbeat communications that one or more combinations of a host port and a storage port do not have I/O connectivity currently enabled between the host port and storage device.

\* \* \* \* \*